Figure 1:
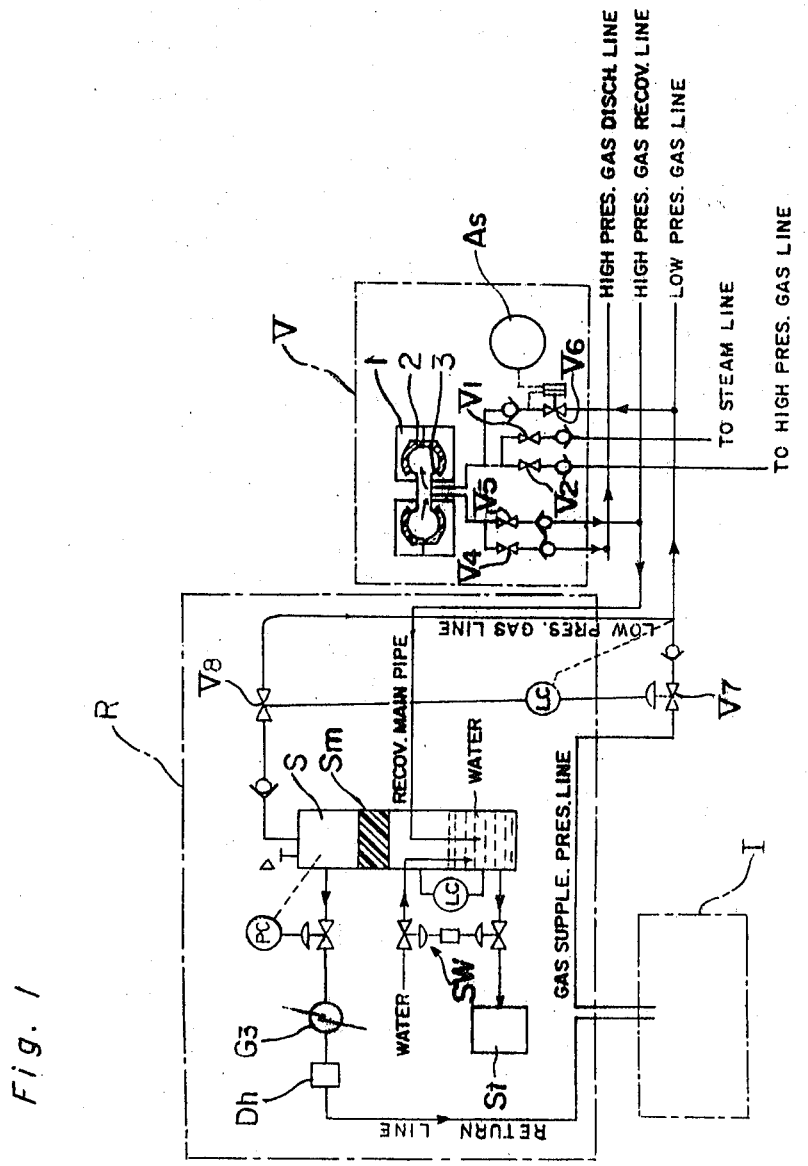

United States Patent [19]

Sakon et al.

[11] 4,406,845

[45] Sep. 27, 1983

[54] METHOD FOR RESTORATION AND RE-UTILIZATION OF DISCHARGED GAS AND ARRANGEMENT EMPLOYED THEREFOR

[75] Inventors: Tohatirou Sakon, Kobe; Ikuo Oyobe, Shirakawa, both of Japan

[73] Assignee: Sumitomo Rubber Industries, Ltd., Hyogen, Japan

[21] Appl. No.: 311,954

[22] Filed: Oct. 16, 1981

[30] Foreign Application Priority Data

Oct. 21, 1980 [JP] Japan ................................. 55-148048

[51] Int. Cl.³ ............................................ B29H 5/02
[52] U.S. Cl. .......................................... 264/37; 264/85; 264/315; 264/326; 425/29; 425/33; 425/58
[58] Field of Search ........................ 425/17, 19, 20, 21, 425/22, 23, 24, 25, 26, 29, 30, 33, 39, 40, 58, 35; 264/37, 85, 315, 326

[56] References Cited

U.S. PATENT DOCUMENTS 1,200,603 10/1916 Gammeten ............................ 425/29
3,443,280 5/1969 Hugger ............................ 425/43 X
4,097,565 6/1978 Cole et al. ........................ 425/30 X
4,222,721 9/1980 Gado ................................. 425/30 X

*Primary Examiner*—J. Howard Flint, Jr.
*Attorney, Agent, or Firm*—Birch, Stewart, Kolasch & Birch

[57] ABSTRACT

A method for restoration and re-utilization of discharged gas for use in a vulcanization employing inert gas in part of the vulcanization of elastomer products, which includes the steps of restoring a mixture of used inert gas discharged from a vulcanizing unit and vulcanizing medium for steam separation thereof, subjecting the elastomer product mounted in a metal mold to a preshaping by supplying the inert gas obtained by the steam separation to the vulcanizing unit prior to starting of the vulcanization, and subjecting the inert gas obtained by the steam separation to supplementary pressurization by inert gas obtained from an inert gas generating unit when the inert gas is to be supplied to the vulcanizing unit, and also an arrangement for carrying out the above method in an efficient manner.

2 Claims, 1 Drawing Figure

METHOD FOR RESTORATION AND RE-UTILIZATION OF DISCHARGED GAS AND ARRANGEMENT EMPLOYED THEREFOR

The present invention generally relates to a method for restoration and re-utilization of discharged gas, and more particularly, to a method for restoration and re-utilization of gas discharged from a vulcanizing unit in a vulcanizing process which employs inert gas in part of vulcanizing steps of elastomer products, especially pneumatic tires etc., and an arrangement employed therefor.

Conventionally, in the vulcanizing process of elastomer products such as pneumatic tires, etc. there has been attempted to employ a combination of steam or hot water and inert gas, but in the above known practice, used inert gas is undesirably discharged into atmosphere without being re-utilized.

On the other hand, in a preshaping process prior to starting of vulcanization of elastomer products, for example, pneumatic tires and the like, compressed air or saturated steam is employed as an expanding medium, but the conventional expanding medium as described above tends to adversely affect the qualities of elastomer products to a large extent, since not only such expanding medium deteriorates inner surfaces of expandable bag-like members or bladders for vulcanization (referred to as bladders hereinbelow) to reduce the life thereof, but the preshaping, for example, by saturated steam imparts a large variation to the configuration and state of the elastomer products due to cooling of the bladders.

Accordingly, an essential object of the present invention is to provide a method of restoration and re-utilization of discharged gas, which is capable of achieving resource saving effects, with simultaneous improvements of life of bladders for vulcanization, and also of qualities of the resultant elastomer products.

Another important object of the present invention is to provide an arrangement for restoration and re-utilization of discharged gas which is capable of effecting the method as described above in an efficient manner.

In accomplishing these and other objects, according to preferred embodiments of the present invention, there are provided a method for restoration and re-utilization of discharged gas for use in a vulcanization employing inert gas in part of the vulcanizing steps of elastomer products, which comprises the steps of restoring a mixture of used inert gas discharged from a vulcanizing unit and vulcanizing medium for steam separation thereof, subjecting the elastomer product mounted in a metal mold to a preshaping by supplying the inert gas obtained by the steam separation to the vulcanizing unit prior to starting of the vulcanization, and subjecting said the inert gas obtained by said steam separation to supplementary pressurization by inert gas obtained from an inert gas generating unit when said the inert gas is to be supplied to said vulcanizing unit, and also an arrangement for carrying out the above method in an efficient manner, which includes a high pressure gas recovery line for collecting a mixture of used inert gas discharged from a vulcanizing unit and vulcanizing medium, a steam separator coupled to said high pressure gas recovery line for subjecting said mixture to steam separation, a low pressure gas line for supplying the inert gas obtained by the steam separation to the vulcanizing unit, and a gas supplementary pressure line connecting said low pressure gas line with an inert gas generating unit.

According to the present invention as described above, there have been presented an improved method for restoration and re-utilization of discharged gas, and an arrangement employed therefor, with substantial elimination of disadvantages inherent in the conventional methods and arrangements of this kind.

These and other objects and features of the present invention will become apparent from the following description taken in conjunction with the preferred embodiment thereof with reference to the accompanying drawing, in which;

FIG. 1 is a block diagram explaining the flow of a process for vulcanization of elastomer products and construction of an arrangement employed therefor according to preferred embodiments of the present invention.

In the first place, it is to be noted that the elastomer products include, for example, pneumatic tires, vulcanizable molded items, etc., and the vulcanizing medium means hot water, steam, cooling water and the like, while the expandable bag-like member indicates, for example, a curing bag or bladder employed in the vulcanization of pneumatic tires, which curing bag or bladder is disposed between the vulcanizing medium and the elastomer product in the case where there is a possibility that the life of the elastomer product is adversely affected due to deterioration on the surface thereof through direct contact of the elastomer product with the heating medium, especially steam or the like.

Meanwhile, the inert gas may be conventional one mainly composed of nitrogen, which can be produced by known methods, for example, the burning furnace system in which fuel gas such as propane gas or the like is burned in a furnace, and the exhaust gas therefrom is cooled to obtained the inert gas.

Referring to FIG. 1, the method for restoration and re-utilization of discharged gas, and the arrangement employed therefor according to the present invention will be described hereinbelow.

In FIG. 1, there is shown, at its right side, a vulcanizing unit V which generally includes a metal mold 1 in which a pneumatic tire 2 to be processed is accommodated, and pipe lines respectively leading to a high pressure gas discharge line, a high pressure gas recovery line, a high pressure gas line, a steam line and a low pressure gas line through corresponding valves V4, V5, V2, V1 and V6, and communicated with a space inside the tire 2, through a curing bag or bladder 3 provided in contact with the inner wall of said tire 2.

More specifically, the process for vulcanization of FIG. 1 further comprises, in addition to an inert gas generating unit I (surrounded by chain lines) and the vulcanizing unit V described above, an inert gas recovering unit R which includes a steam separator S of a pressure vessel construction constituted by a mist separator Sm, a water feeding mechanism Sw, a water level controller LC and a hot water tank St, a return line connecting a low pressure storage tank (not shown) in the inert gas generating unit I with said steam separator S through a dehumidifier Dh, a cooler G3 and a pressure controller. The high pressure gas recovery line is connected to the inner side of the metal mold 1 through the valve V5 provided in a parallel relation with the valve V4 for the high pressure gas discharge line, and is also connected to the steam separator S through a recovery main pipe, while the low pressure gas line is communicated with the inner side of the metal mold 1 through the valve V6 and also, with the steam separator S, and further connected to the low pressure storage tank (not shown) of the generating unit I through an automatic control valve V7 and a gas supplementary pressure line, with the valve V7 being further connected to a valve V8 provided in the low pressure gas line through a pressure controller.

The arrangement of FIG. 1 is adapted to function as follows.

Upon termination of the heating process in the vulcanization of the tire 2 mounted between the metal mold 1 and bladder 3, the valve V5 for the high pressure gas recovery line is opened (in this case, the valve V4 for the high pressure gas discharge line is closed, and the cooling water for the subsequent process is fed into the tire 2 through the bladder 3), and the mixture of the inert gas and steam, and the mixture of the inert gas and cooling water enter the high pressure gas recovery line so as to be fed into the steam separator S in the inert gas recovery unit R. In the above case, the mixtures as described above are not all collected, but recovered only for a predetermined period of time, for example, for about one minute before entering the discharge process. The high pressure gas recovery line is provided for each vulcanizing unit separately from the existing discharge line, and includes the valve V5 (automatic valve for recovery), a control circuit (not shown here) and the return main pipe, which has a sufficient capacity (for example, inner pipe flow rate of 3 to 20 m/sec. and more preferably, of 5 to 10 m/sec.) for the prevention of circuit loss.

The mixtures as referred to above are subjected to the steam separation by the steam separator S, and inert gas under low pressure (for example, $2 \sim 5$ kg/cm$^2$G) and at temperatures of about 40° to 120° C. and humidity of 100% is recovered to be introduced into the low pressure gas line. The low pressure gas line is maintained under a predetermined pressure by the automatic control valve V8 by receiving signal from the pressure controller.

Before starting the vulcanization, the valve V6 for the low pressure gas line is opened, and the inert gas pressurized to have a desired green tire shaping pressure (for example, $0.1 \sim 3$ kg/cm$^2$G) by the operating air signal As preliminarily set as desired, is supplied into the green tire 2 mounted on the lower mold through the bladder 3 for preshaping of said green tire. The preshaping by the inert gas as described above is free from the disadvantages in the conventional shapings by the compressed air or saturated steam, such as shortening of the life of bladders, adverse effect to the qualities of tires due to large deviations in the shapes or preshaping condition of the tires resulting from undesirable cooling of the bladders. The surplus inert gas in the recovery enters the return line, and, through the steps for cooling by the cooler G3 and dehumidification by the dehumidifier Dh, is fed into the low pressure gas line (not shown) of the inert gas generating unit I. The return mechanism as described above is not necessarily required, if the restored inert gas is all consumed for the preshaping at all times.

The low pressure gas line is accompanied by the gas supplementary pressure line, which is connected from the low pressure tank mentioned earlier of the inert gas generating unit I to the low pressure gas line through the automatic control valve V7, and arranged to supply the low pressure gas to the low pressure gas line by receiving signal from the pressure controller so as to maintain the shaping pressure for the tire at the starting of the preshaping under a desirably stable condition. In the inert gas recovering unit R, hot water obtained by the waste heat of steam as a result of the steam separation may be stored in the hot water storage tank St so as to be suitably re-utilized for boilers, heating, temperature control devices, etc.

As is seen from the foregoing description, according to the arrangement of FIG. 1, in the vulcanizing process utilizing inert gas in part of the vulcanizing steps of elastomer products, the inert gas discharged from the vulcanizing unit is subjected to the steam separation so as to be utilized for the preshaping prior to the starting of the vulcanization of elastomer products, and thus, energy cost may be saved by about 30 to 40% as compared with that in the conventional vulcanizing processes.

It should be noted here that, the inert gas generating unit I described as employed in the embodiment of FIG. 1 is replaced by a nitrogen gas generating unit including a liquid N$_2$ storage tank coupled, through a carburetor and a pressure reduction valve, to a nitrogen receiver tank which is further connected to the high pressure gas line via a valve associated with a pressure controller, although the modified arrangement is not particularly shown here. In the above modified arrangement, liquid nitrogen contained in the liquid N$_2$ storage tank is formed, through the carburetor and pressure reduction valve, into nitrogen gas, which is utilized for the same purpose as in the inert gas in the embodiment of FIG. 1 through the change-over valves in the similar manner. In the above case, nitrogen at high purity at 0.999 may be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method for the restoration and re-utilization of discharged gas for use in vulcanization employing an inert gas in part of the vulcanizing steps of elastomer products, which comprises the steps of restoring a mixture of used inert gas discharged from a vulcanizing unit and vulcanizing medium for steam separation thereof, subjecting the elastomer product mounted in a metal mold to a preshaping by supplying the inert gas obtained by the steam separation to the vulcanizing unit prior to starting of the vulcanization, and subjecting said inert gas obtained by said steam separation to supplementary pressurization by inert gas obtained from an inert gas generating unit when said inert gas is to be supplied to said vulcanizing unit.

2. An apparatus for the restoration and re-utilization of discharged gas for use in vulcanization employing inert gas in part of the vulcanizing steps of elastomer products, which comprises a high pressure gas recovery line for collecting a mixture of used inert gas discharged from a vulcanizing unit and vulcanizing medium, a steam separator coupled to said high pressure gas recovery line for subjecting said mixture to steam separation, a low pressure gas line for supplying the inert gas obtained by the steam separation to the vulcanizing unit, and a gas supplementary pressure line connecting said low pressure gas line with an inert gas generating unit.

\* \* \* \* \*